May 14, 1963 D. A. KLEINMAN ET AL 3,089,995

HALL-EFFECT APPARATUS

Filed June 6, 1960

INVENTORS D. A. KLEINMAN
A. L. SCHAWLOW
BY A. J. Torsiglieri
ATTORNEY

United States Patent Office 3,089,995
Patented May 14, 1963

3,089,995

HALL-EFFECT APPARATUS

David A. Kleinman, Plainfield, and Arthur L. Schawlow, Madison, N.J., assignors to Bell Telephone Laboratories, Incorporated, New York, N.Y., a corporation of New York Filed June 6, 1960, Ser. No. 34,272
8 Claims. (Cl. 321—2)

This invention relates to apparatus utilizing a Hall-effect disk for providing rectification, regulation or negative resistance effects.

In one aspect, an object of the present invention is solid state apparatus for providing a negative resistance with the capacity for handling large currents.

In this aspect, the invention is based on our discovery that a disk of appropriate material, properly interconnected into an appropriate circuit can develop a negative resistance.

In another aspect, an object of the invention is a low impedance, low voltage and high current regulated source.

In this aspect, the invention is based on our discovery that a disk of appropriate material and properly interconnected with a voltage source can provide rectification and regulation characteristics.

It has long been known as the results of experiments by O. M. Corbino in 1911 that a disk of an appropriate metal exhibiting a large Hall angle, to be termed herein a Hall-effect disk, and having inner and outer concentric contacts, when placed in a magnetic field which is parallel to the axis of the disk, will exhibit a positive resistance which varies with the strength of the magnetic field. This magnetoresistive effect is independent of the direction of the magnetic field or the sign of the charge carrier but is dependent on the Hall mobility of the disk material. The change in resistance with change in the strength of the magnetic field can be ascribed to the change in the length of the spiral current path resulting because the current flows at the Hall angle to the radial electric field.

We have recognized that if the Hall mobility and consequently the Hall angle is sufficiently large, as is the case with high mobility semiconductors, such as indium antimonide and especially the semimetals bismuth and tin at low temperatures, there is a considerable axial magnetic field associated with the spiral current itself, and this axial self-field interferes with the applied axial field constructively if the charge carriers flow inwardly in the disk and destructively if the charge carriers flow outwardly in the disk, without regard to the direction of the field or the sign of the carriers. As a result of this, the resistance of the disk is higher when the self-field is constructive than when it is destructive, since in the former case the current path is lengthened while in the latter case the current path is shortened. As a consequence, the disk can be made to exhibit rectification and voltage regulation properties.

We have discovered further that when a disk of the kind described is combined with a coil to provide the applied magnetic field and the disk and coil are connected in parallel the disk exhibits a negative resistance region in its voltage-current characteristics.

Accordingly, a feature of the invention is a negative resistance arrangement comprising a parallel combination of a disk of the kind described and a coil disposed to have its axis normal to the plane of the disk. In particular, the coil advantageously is wound to have a radius smaller than that of the disk.

Additionally, it is advantageous that at least the outer contact to the disk and preferably the inner contact and the coil too be superconductors at the temperature of operation.

For utilization of the negative resistance effect it is important to provide a low impedance, low voltage and high current source since the disk is a low impedance element requiring a high current for achieving the negative resistance.

To this end, in accordance with another aspect, the invention is such a source, including a source of alternating voltage which is rectified by a pair of Hall-effect disks, the rectified voltage being regulated by still another Hall-effect disk.

In an illustrative embodiment of the invention, a regulated voltage source of the kind described is used to apply a suitable voltage to the parallel combination of another Hall-effect disk and coil whereby a negative resistance is developed for utilization purposes.

In the preferred embodiment a specific circuit is provided which maximizes the efficiency.

The invention will be better understood from the following more detailed description, taken in conjunction with the accompanying drawing, in which.

Figure 1:
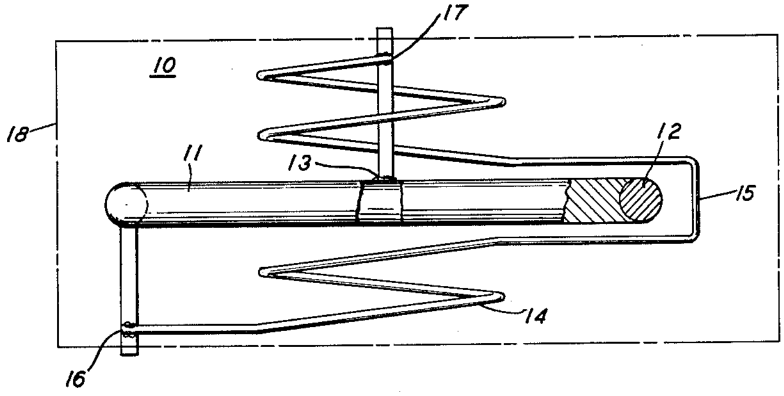
FIG. 1 shows in schematic form the basic form of the negative resistance arrangement in accordance with the invention.

With reference now more particularly to the drawing, the negative resistance arrangement 10 shown in FIG. 1 comprises a thin circular disk 11 having an outer ring electrode 12 extending peripherally around the disk and an inner electrode 13 connected at the center of the disk. Advantageously, the disk is cut from a single crystal of bismuth normal to the trigonal axis. The bismuth is doped with tellurium to make it n-type. Alternatively, the bismuth may be doped with tin to make it p-type. However, n-type bismuth is preferred because of the higher mobility of electrons as compared to holes. Advantageously, the electrodes 12 and 13 are of a superconducting material, such as niobium-tin. Additionally, a coil 14 of about three turns is disposed to have its axis perpendicular to the disk. The coil is provided with a split winding so that half of it may be on each of the two opposite sides of the disk. The coil includes an intermediate section 15 for bypassing the disk. The radius of the coil is less than the radius of the disk as will be discussed. Typical values for the two radii are one centimeter and two centimeters, respectively.

The coil 14 is connected in parallel with the disk to form a two-terminal arrangement. In particular, outer electrode 12 and one end of the coil winding are each connected to terminal 16 and inner electrode 13 and the other end of the coil winding are each connected to terminal 17. Advantageously, the resistance of the coil is considerably larger, at least by a factor of ten, than that of the disk.

The disk and coil are enclosed within suitable refrigerating equipment shown schematically by the broken line 18. Such equipment typically provides an environment sufficiently cold that the disk electrodes are in a superconducting state and the n-type bismuth exhibits very long electron mean free paths and a very high electron mobility.

It is important that the magnetic field acting on the disk vary with the current in the coil. When the outer disk electrode is superconducting, this requires that the radius of the coil be less than that of the disk. This will serve to confine the return flux outside the coil to passage through the disk. As a result, there will be magnetic flux of one direction passing through the central portion of the disk opposite the inside of the coil and a like magnetic flux of opposite direction passing through the surrounding annular portion of the disk. Under these conditions, the magnetic flux in each direction will be dependent on the current in the coil despite the presence of the superconducting outer electrode.

Figure 2:
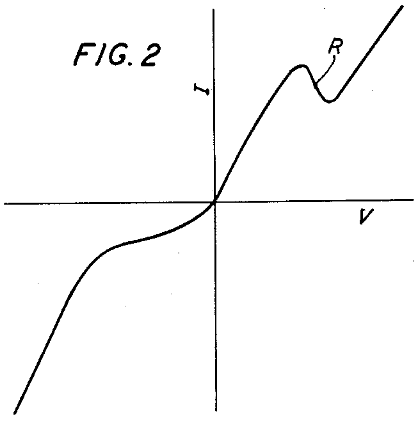
FIG. 2 shows the voltage-current relationship of the arrangement shown in FIG. 1.

FIG. 2 is a plot on a log-log scale of a typical voltage-current characteristic measurable between terminals 16 and 17.

In particular, the sign conventions are such that the first quadrant corresponds to the situation where the direction of current flow is from the outer electrode to the inner electrode, corresponding to an actual electron flow outwardly from the inner electrode to the outer electrode. Conversely, the third quadrant corresponds to the situation where the direction of current flow is from the inner electrode to the outer electrode and the actual electron flow is opposite.

In particular, it is to be noted that the characteristic includes in the first quadrant a negative resistance portion R corresponding to a region of negative slope. It is in accordance with the invention to choose the operating point on this negative resistance portion of the characteristic.

Figure 3:
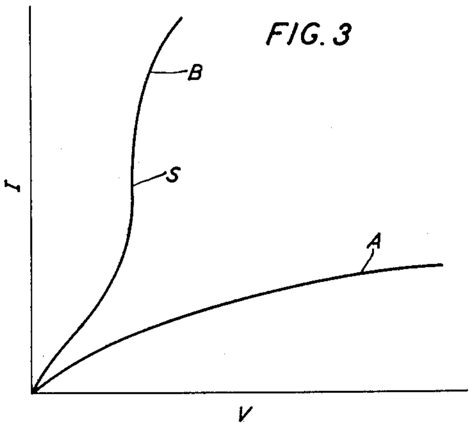
FIG. 3 shows the voltage-current relationship of a disk in a steady magnetic field.

FIG. 3 is a plot on a log-log scale of the voltage-current characteristic measurable between terminals 16 and 17 in the absence of the coil when the disk is in a uniform magnetic field supplied by an independent source. The curve labeled A corresponds to the case in which the direction of current flow in the disk provides a constructive self-field, that is, the carrier flow spirals inward. The curve labeled B corresponds to the case in which the direction of current flow in the disk provides a destructive self-field, that is, the carrier flow spirals outward.

It can be seen that the resistance in the constructive direction is much higher than in the destructive direction attesting to the rectification properties. Moreover, it can be seen that there is a range S where curve B is nearly vertical. This range is useful for providing voltage regulation properties. In particular, by shunting such a disk across a voltage source of magnitude in this range, the voltage provided by the source is regulated.

Figure 4:
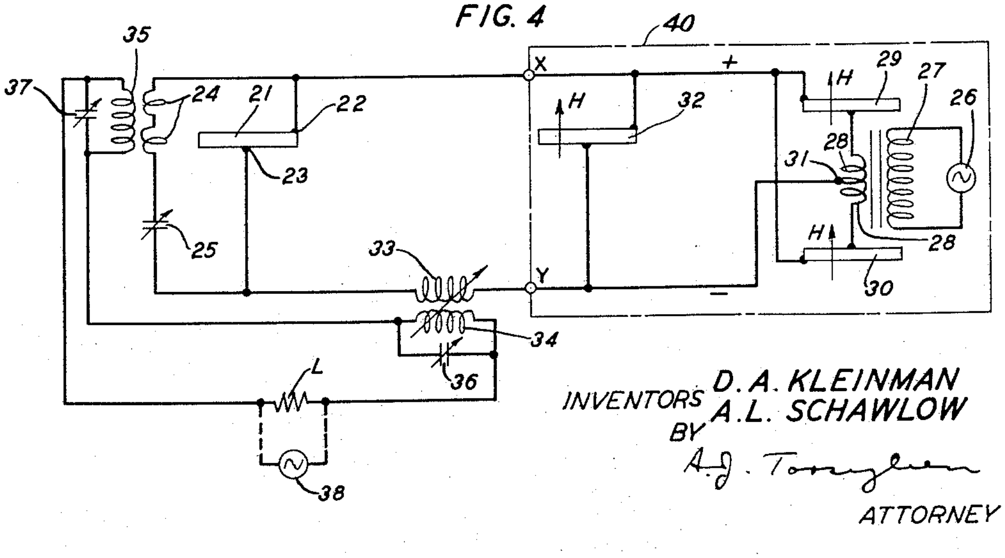
FIG. 4 shows an embodiment in accordance with the invention incorporating the negative resistance arrangement shown in FIG. 1 and a regulated voltage source arrangement utilizing a Hall-effect disk.

FIG. 4 shows schematically a circuit arrangement including a parallel combination of the kind described in FIG. 1 to provide a negative resistance and a voltage regulated source in accordance with the other aspect of the invention. In particular, disk 21 which is provided with an outer electrode 22 and an inner electrode 23, together with coil 24, forms a parallel combination similar to that of disk 11 and coil 14 discussed in connection with FIG. 1. Additionally, it is found advantageous for operation at frequencies above the middle audio range to insert capacitor 25 in series with coil 24 of capacitance to form a series resonant circuit at the frequency of operation.

The desired bias for providing operation in the negative resistance range is supplied by the regulated voltage supply 40 shown enclosed by the broken line. This supply 40 needs to be a well regulated low voltage, high current source.

To this end, an alternating current source 26, typically at the line voltage is supplied to the input winding 27 of a step-down transformer. The two ends of the output winding 28 are connected to the inner contacts of Hall-effect disks 29 and 30, respectively, of the kind described. The outer contacts of the disks are connected to a common lead which serves as terminal X of the full-wave rectifier formed by the arrangement described and the center tap 31 of the output winding is connected to the other terminal Y of the full-wave rectifier. Auxiliary equipment not shown maintains a steady magnetic field in disks 29 and 30. This is shown schematically by the vector H. In the manner characteristic of full-wave rectifiers, it will usually be advantageous to provide some filtering action. However, in the interest of simplicity, appropriate equipment to this end is not shown in the drawing. Typically, such equipment includes a series inductor and/or a shunt capacitor. The voltage provided by the output winding is chosen to provide a level of direct-current output voltage across terminals XY suitable for biasing the disk 21 in its negative resistance range.

To provide the desired voltage regulation, an additional Hall-effect disk 32 of the kind described is shunted across terminals XY. Disk 32 also is immersed in a steady magnetic field as shown schematically by the vector H. Disk 32 is chosen so that it provides regulation at the level to be maintained across terminals XY.

For use of the negative resistance developed by the disk 21, it is important to provide a load in its output branch. To this end, a primary winding 33 of a transformer is included serially between the disk 21 and the voltage source 40. The load L is connected across the output winding 34 of this transformer.

To improve the efficiency of the circuit, it is advantageous to make the winding 24 associated with disk 21 the input winding of a transformer, of which the output winding 35 is inserted serially with winding 34. The ratios of windings 33, 34 and 24, 35 are chosen such that the impedance seen by the disk 21 is appropriate for the negative resistance developed. It is also desirable to connect variable capacitors 36 and 37 across the windings 34 and 35, respectively, to tune such windings for resonance at the operating frequency. The coupling between windings 33, 34 and 24, 35 is made variable to provide a further degree of control.

For use as an oscillator, it is unnecessary to apply any signal. The load is adjusted to a value sufficiently low that the circuit is unstable and oscillation results at the resonant frequency of the various tuned branches in the manner characteristic of negative resistance oscillators.

For use as an amplifier, the load is adjusted to a value sufficiently high that the circuit is stable and the source 38 of input signals to be amplified is connected across the load.

As previously mentioned, because of the low impedance of the disks the resistances of the various other elements should also be kept low. In particular, it is advantageous to maximize the use of superconducting materials. For example, it is advantageous that the leads interconnecting the lumped elements be superconducting, that the various coils be superconducting, and especially that the plates or foils of the capacitors be superconducting.

It is to be understood that the specific embodiment described is merely illustrative of one circuit application of the invention. Various other circuit applications of negative resistance arrangements are well known in the art.

What is claimed is:

1. A negative resistance arrangement comprising a Hall-effect disk, a first electrode contacting the periphery of said disk, a second electrode contacting a central portion of said disk, a coil having its axis normal to the central portion of the disk and its radius smaller than the radius of the disk, the coil being connected in parallel with the disk, and a voltage source connected between the two electrodes for biasing the disk to a negative resistance region of its characteristic.

2. The negative resistance arrangement in accordance with claim 1 characterized in that at least the first electrode is of superconducting material.

3. The negative resistance arrangement in accordance with claim 1 characterized in that the first and second electrodes are of superconducting material, the coil is split into two sections, separate sections being on opposite sides of the disk, and the disk is of single crystal bismuth.

4. A direct-current voltage source comprising a source of alternating voltage, a full wave rectifier comprising a pair of Hall-effect disks, each disk including first and second concentric electrodes one at its center and the other around its periphery, and a transformer having primary and secondary windings, the source of alternating voltage being connected to the primary winding of the transformer, the first electrodes of the two disks being connected directly together to provide one output terminal, the second electrodes of the two disks being connected together by way of the secondary winding of the transformer, a center tap to the secondary winding providing the other output terminal, and means for biasing said disks comprising a steady unidirectional magnetic field.

5. A regulated direct-current voltage source comprising a direct-current voltage source to be regulated and in parallel therewith, regulating means comprising a Hall-effect having first and second concentric electrodes, the first electrode extending around its periphery and the second electrode connected at its center, and means for providing a steady magnetic field through the disk for biasing the disk magnetically so that it exhibits a voltage regulating characteristic.

6. In combination, a direct-current voltage source comprising an alternating voltage source and a pair of Hall-effect disks connected in full-wave rectification relation with said alternating voltage source, regulating means comprising a third Hall-effect disk connected in parallel across the direct-current voltage source, a fourth Hall-effect disk, a first coil connected in parallel with said fourth Hall-effect disk and oriented to have its axis normal to the disk, a second coil connected serially between said fourth Hall-effect disk and the regulated direct-current voltage source, and an output branch including third and fourth coils, coupled magnetically to said first and second coils respectively, and a load serially connected with said third and fourth coils.

7. A regulated direct-current source comprising a direct-current source in accordance with claim 4 and in parallel therewith, regulating means comprising a Hall-effect disk having first and second concentric electrodes, the first electrode connected to its periphery and the second electrode connected to its center, and means for providing a steady magnetic field through the disk for biasing the disk magnetically so that it exhibits a voltage regulating characteristic.

8. In combination, a negative resistance arrangement comprising a first Hall-effect disk having one electrode contacting the periphery of said disk and another electrode contacting a central portion of said disk, and a coil having its axis normal to the central portion of the disk and its radius smaller than the radius of the disk, the coil being connected in parallel with the disk, means for utilizing the negative resistance developed connected in series with said two electrodes, and a regulated voltage source in accordance with claim 7 for biasing the disk in a negative resistance region of its voltage-current characteristic.

References Cited in the file of this patent

UNITED STATES PATENTS

| | | |
|---|---|---|
| 1,778,796 | Craig | Oct. 21, 1930 |
| 2,619,627 | Slepian | Nov. 25, 1952 |
| 2,774,890 | Semmelman | Dec. 18, 1956 |
| 2,909,679 | Abraham | Oct. 20, 1959 |
| 2,939,916 | Miller | June 7, 1960 |
| 2,986,724 | Jaeger | May 30, 1961 |
| 3,008,083 | Kuhrt et al. | Nov. 7, 1961 |

FOREIGN PATENTS

| | | |
|---|---|---|
| 163,573 | Sweden | Nov. 3, 1954 |